United States Patent Office 3,563,030
Patented Feb. 16, 1971

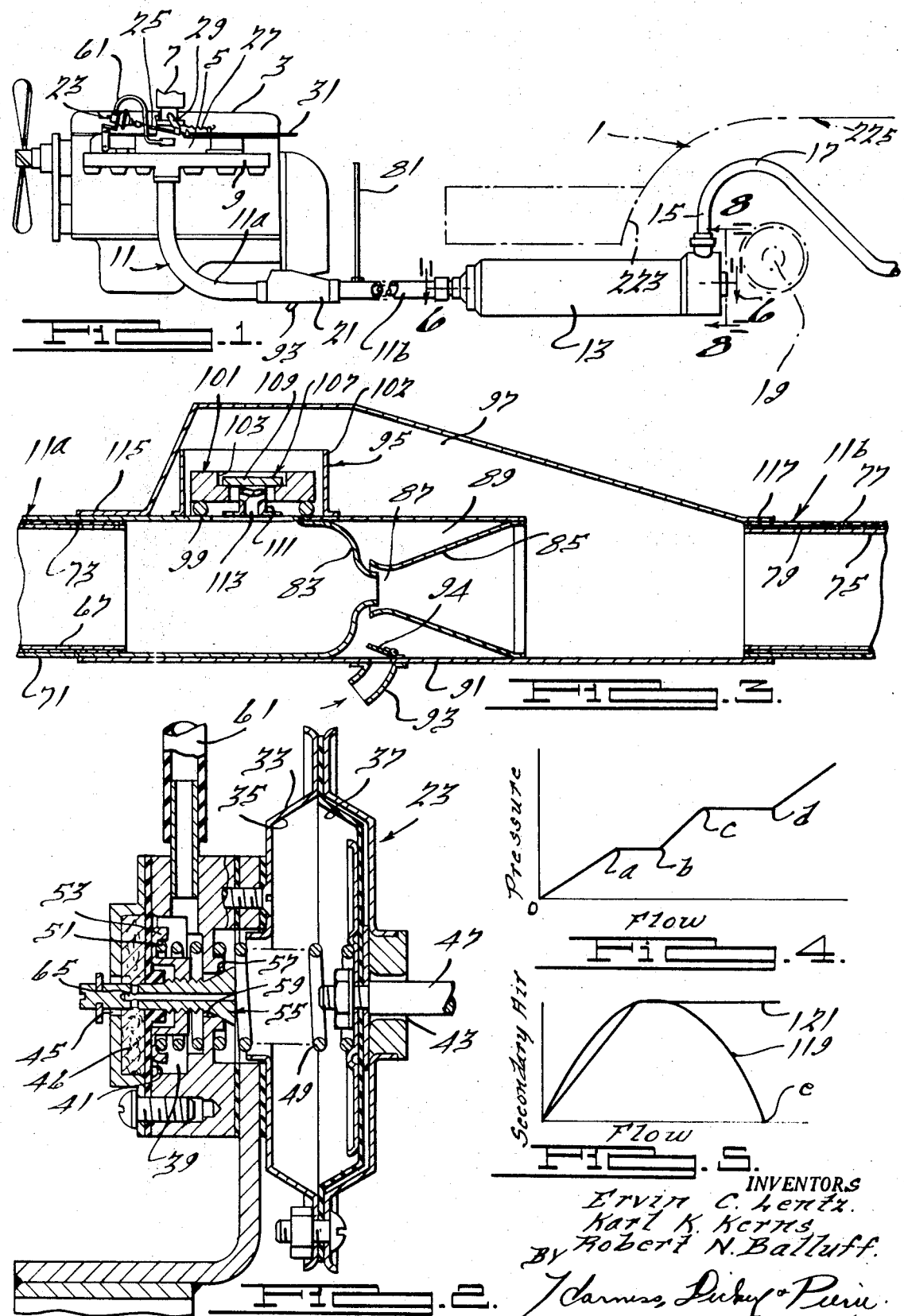

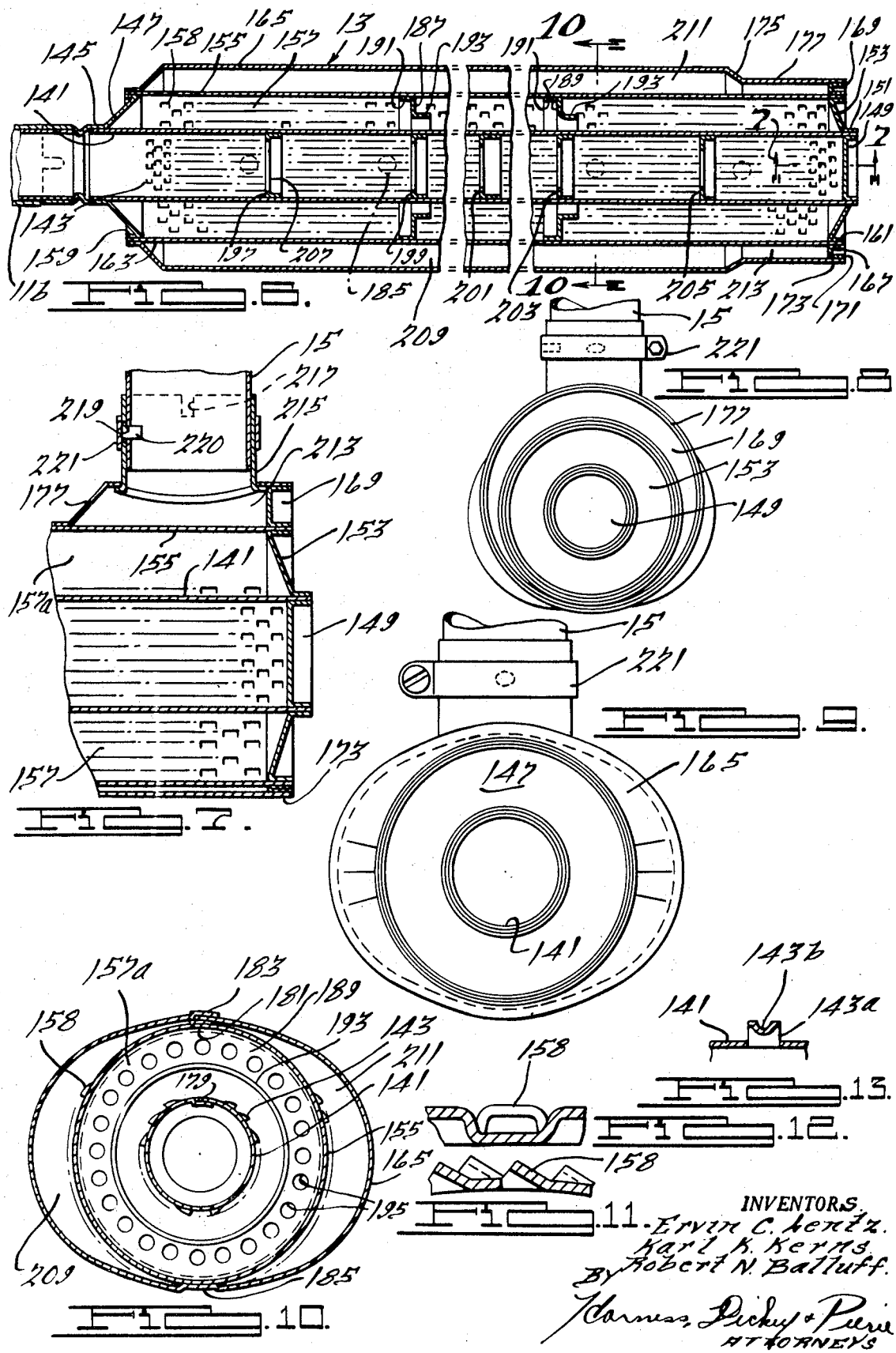

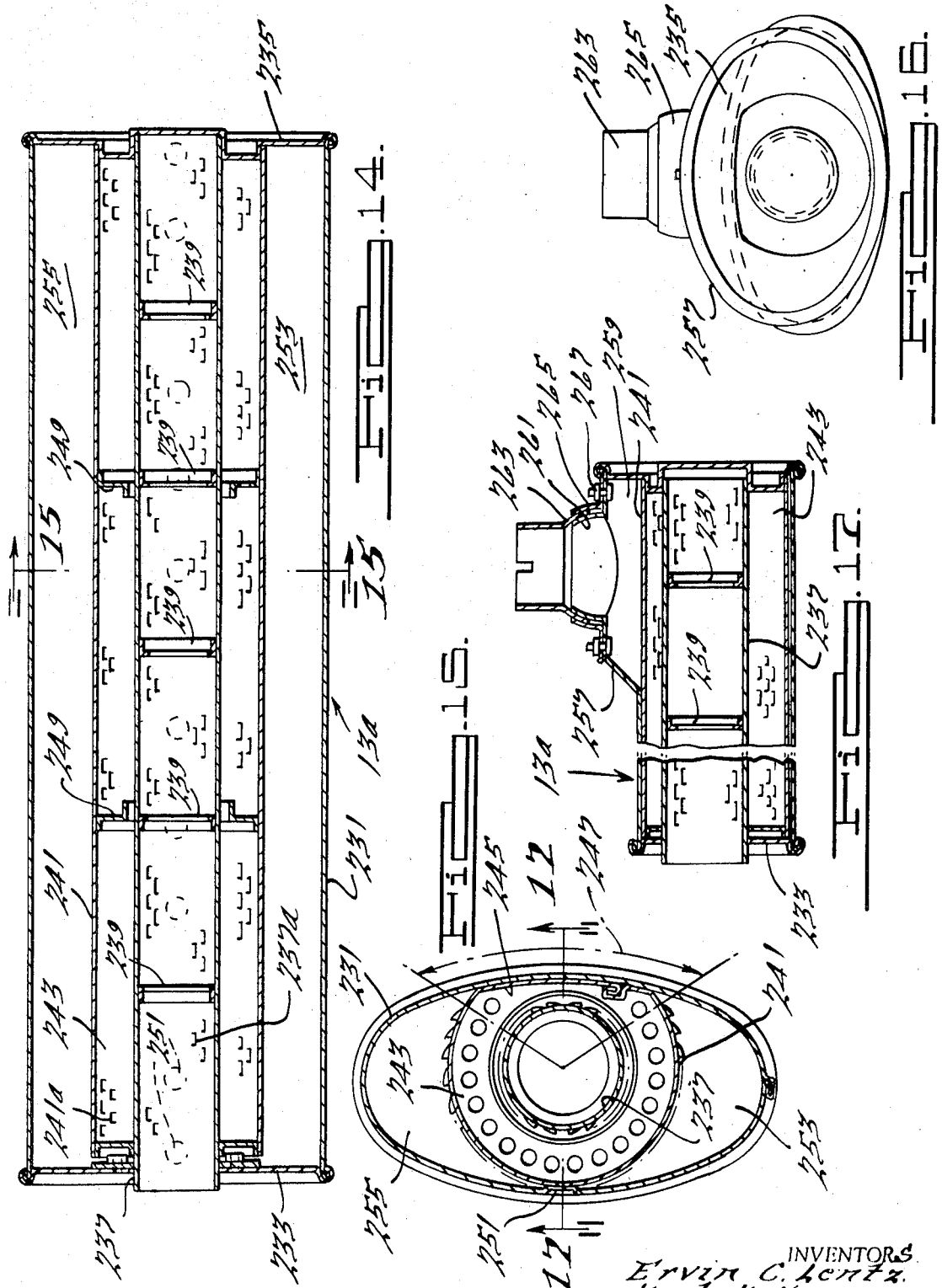

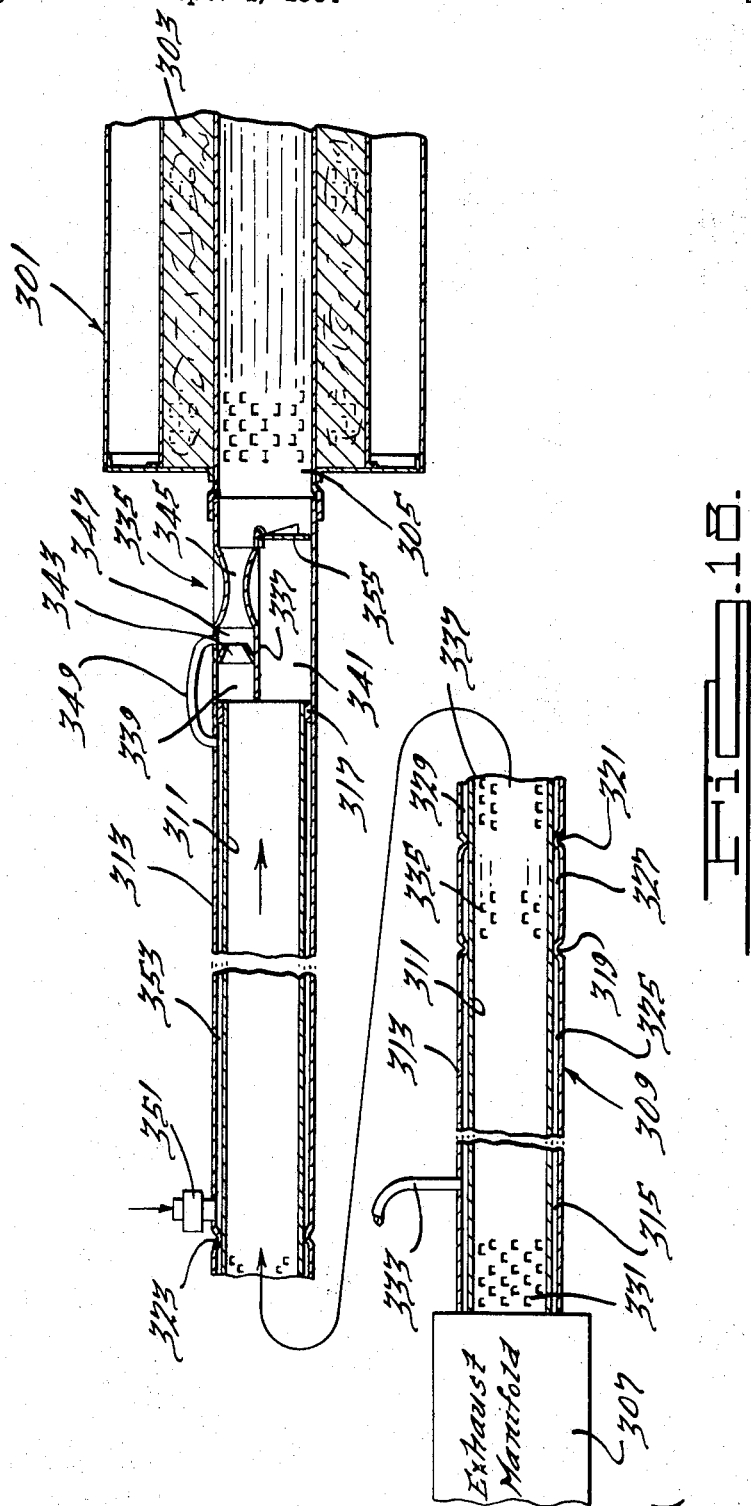

3,563,030
EXHAUST SYSTEM
Ervin C. Lentz, Karl K. Kerns, Jackson, and Robert N. Balluff, Leslie, Mich., assignors, by mesne assignments, to Tenneco Inc., Houston, Tex., a corporation of Delaware
Application Sept. 1, 1964, Ser. No. 393,623, which is a continuation-in-part of applications Ser. No. 290,403, and Ser. No. 290,499, both June 25, 1963. Divided and this application Feb. 10, 1969, Ser. No. 816,448
Int. Cl. F01n 7/16, 1/14, 3/08
U.S. Cl. 60—30                          5 Claims

ABSTRACT OF THE DISCLOSURE

A catalytic reactor system for reducing the level of unburned emissions from an automobile internal combustion engine includes, in combination, a reactor device of special construction and an automatically controlled device for admitting secondary combustion air and also means for limiting the level of hydrocarbons and CO upon deceleration of the engine.

CROSS REFERENCE TO RELATED APPLICATIONS

This application is a divsion of Ser. No. 393,623 filed Sept. 1, 1964, which was a continuation-in-part of applications 290,499 and 290,403, each filed on June 25, 1963, all applications now being abandoned.

This invention relates to means, including a catalytic reactor, for reducing the quantity of unburned emissions that are discharged into the atmosphere from the exhaust system of an internal combustion engine.

It is the purpose of this invention to provide an emission reduction system that (1) will exceed the requirements of the California air pollution control authorities, (2) is safe under all operating conditions, and (3) is commercially practical so that the components can be manufactured and sold at a reasonable price.

Briefly, the invention contemplates a system in which a catalytic reactor having no over-temperature controls is used in the engine exhaust system. Where necessary, there is also used an emission control means associated with the engine to control the quantity of unburned hydrocarbons and CO discharged into the exhaust system.

The invention is illustrated in the accompanying drawings in which:

FIG. 1 is a side elevation, partly schematic, of an emission reduction system embodying the invention;

FIG. 2 is an enlarged sectional view of a throttle cracking device used to control emissions discharged by the engine into the exhaust system;

FIG. 3 is an enlarged, longitudinal, broken-away section of the insulated exhaust gas conduit and the secondary air induction means;

FIG. 4 is a pressure vs. flow curve;

FIG. 5 is a secondary air vs. flow curve;

FIG. 6 is an enlarged longitudinal section along the line 6—6 of FIG. 1 through a catalytic reactor;

FIG. 7 is an enlarged section along line 7—7 of FIG. 6;

FIG. 8 is an enlarged view along the line 8—8 of FIG. 1;

FIG. 9 is an enlarged end elevation taken from the left of FIG. 6;

FIG. 10 is an enlarged section along line 10—10 of FIG. 6;

FIG. 11 is an enlarged cross section through louvers in the outer catalyst bed support;

FIG. 12 is a side elevation of the louvers of FIG. 11;

FIG. 13 is a cross section through a modified form of louver;

FIG. 14 is a longitudinal section similar to FIG. 6 through a modified form of reactor;

FIG. 15 is an enlarged cross section on line 15—15 of FIG. 14;

FIG. 16 is an end elevation from the right of FIG. 14;

FIG. 17 is a reduced and simplified cross section on line 17—17 of FIG. 15; and

FIG. 18 is a partly schematic view, partly in section, of a modified emission reducing system.

Referring to FIG. 1 of the drawings, an automobile 1 has an internal combustion engine 3 with an intake manifold 5 and a carburetor 7 connected to it. The engine 3 has an exhaust manifold 9, and an exhaust pipe 11 carries the exhaust gases to the catalytic reactor 13. The reactor 13 has a side (top) outlet connected to a tailpipe 15 which includes a kick-up 17 over the rear axle 19 of the automobile. The exhaust pipe 11 includes a venturi device 21 for inducting secondary air into the exhaust gases to provide sufficient oxygen to complete combustion of the unburned constituents in reactor 13.

EMISSION CONTROL AT THE ENGINE

The reactor 13 has no over-temperature controls (such as a means to by-pass the exhaust gases when the temperature exceeds a predetermined maximum) and, accordingly, means are provided, preferably at the engine, to limit the amount of unburned emissions in the exhaust gases to a level that can be safely handled by the reactor 13 without danger of overheating. Preferably, two forms of controls at the engine are employed. First, there is preferably a control of the engine emissions during idle and normal driving. Second, there is preferably a control of the emissions during deceleration, which is the high emission condition of engine operation.

For the sake of reference, the present California regulations require the system to lower emissions passing out the tailpipe to a level of no more than 275 p.p.m. hydrocarbons and 1½% CO. During deceleration of the engine, it is not unusual for the hydrocarbon emissions to reach the level of 5000 p.p.m.

For the first control, an ordinary engine tune-up such as can be obtained in any garage (or is already present in new cars or properly conditioned used cars) is preferably used. The tune-up (or other means of control) should limit the unburned hydrocarbon emissions to substantially no more than 1500 p.p.m. (parts per million) during idling of the engine and 700 p.p.m. during operation of the engine at normal driving speeds and loads. The CO in any case should not be less than about 1½% (as it supplies heat needed to complete the reaction) and the tune-up preferably adjusts the CO to the range of about 3 to 3½% during idle and 2 to 3% during normal operation. Emissions during idle can be higher because the volume of exhaust gas passing through the reactor 13 is lower than during normal driving.

For the second control, any suitable device to restrict hydrocarbon emissions to substantially no more than about 3000 p.p.m. during deceleration may be used. This can be done by limiting the vacuum in the intake manifold 5 to about 22″ of mercury. A device 23 to do this is illustrated in FIG. 2, this device forming the subject matter of a copending application of Keith Rhodes, Ser. No. 352,594 filed Mar. 17, 1964, assigned to the assignee hereof. The device 23 will operate when vacuum in intake manifold 5 reaches a predetermined level (preferably 22″ Hg) to pull cable 25 to the left in FIG. 1 against the resistance of throttle closing spring 27 to pivot throttle lever 29 in a clockwise direction and crack open the throttle valve (not shown) in carburetor 7 even though the driver of the vehicle may not be depressing the accelerator rod 31, i.e., may be decelerating.

Referring to FIG. 2, the device 23 has a housing 33 which includes a large diaphragm chamber 35 containing diaphragm 37 and a smaller diaphragm chamber 39 containing diaphragm 41. Atmospheric air can reach the right side of diaphragm 37 through opening 43 and the left side of the diaphragm 41 through opening 45 after passing through filter 46. Link 47 is attached at one end to the diaphragm 37 and at the other to cable 25 so that movement of the diaphragm 37 to the left will pull the cable and crack the throttle as mentioned above. The spring 49 urges the diaphragm 37 to the right in which positon the cable 25 has no effect on the throttle lever 29 by virtue of its connection thereto which includes a one way or slip fit attachment (not shown) so that the cable affects the lever 29 only when it is pulled to the left. The spring 51 urges the diaphragm 41 to the left along with the diaphragm plate 53 and the valve member 55 which is threaded through the plate and has a valve head 57 that controls communication between diaphragm chambers 35 and 39 through connecting passage 59. With the parts in the positions shown, valve head 57 is seated and the vacuum in manifold 5 is below the high emmission level.

The diaphragm chamber 39 is connected by a flexible conduit 61 to the intake manifold 5 so that the pressures of the two are substantially the same. The valve member 55 is previously adjusted axially on the plate 53 so that when the vacuum on the right side of the diaphragm 41 reaches the high emission level (about 22″ Hg in manifold 5) the atmospheric pressure on the left of diaphragm 41 will overcome spring 51 to move the assembly to the right and unseat valve head 57 thereby letting vacuum reach the left side of large diaphragm 37. Air pressure on the right of diaphragm 37 therefore pushes it to the left to pull cable 25 and crack open the throttle to control the minimum pressure (limit the vacuum) in the intake manifold 5 at the desired level. When the high vacuum condition in manifold 5 passes, as during idling or acceleration, the pressure to the right of control diaphragm 41 will rise, moving it to the left to seat valve head 57. The small axial and radial bores 65 in the valve member 55 permit atmospheric air to reach the left side of the large diaphragm 37 so that the spring 49 can push the diaphragm back to the position shown in FIG. 2 wherein the device is not affecting throttle operation.

Instead of a device as shown in FIG. 2, in some automobiles it may be possible to use a ported spark arrangement and retarded idle timing if necessary to allow opening of the throttle a little at idle and deceleration to let slightly more air and fuel in to the cylinders.

INSULATED EXHAUST PIPE

The exhaust pipe 11 which carries the exhaust gases from the exhaust manifold 9 to the reactor 13 is preferably insulated to preserve the heat in the exhaust gases and thereby facilitate warm-up to operating temperature of the reactor 13. Insulation may be provided in various ways. For example, the pipe section 11a is laminated so that it has inner and outer layers 67 and 71 of steel and an intermediate layer 73 of glass fiber. The pipe section 11b is of an alternate construction and comprises inner and outer steel tubes 75 and 77 which are separated to form a dead air chamber 79 between them. The ends of the tubes are sealed together so that no air can flow to or from the chamber 79. Preferably, however, a flexible tube 81 connects the chamber 79 to the intake manifold 5. Thus, the degree of vacuum and accordingly the degree of insulation will vary as the vacuum in the intake manifold 5. Further modifications are shown in FIG. 18.

SECONDARY AIR

Secondary air to supply sufficient oxygen for complete combustion of the unburned constituents is supplied by suitable means. Preferably, there is about 2 to 2½ c.f.m. secondary air at idle and an increase of air up to about 4-5 c.f.m. at exhaust flows of 30-35 c.f.m. This may be an air pump (not shown) driven by the engine and delivering air to the exhaust manifold 9. Such a pump should be provided with a sonic nozzle outlet, or the equivalent, to maintain a constant output as exhaust gas flows about 30-35 cubic feet per minute (c.f.m.) as indicated qualitatively by curve 121 in FIG. 5.

It is very desirable that the quantity of secondary air inducted into the exhaust gases decrease with increasing exhaust gas flows above about 45-50 c.f.m. so that at high speeds the system will be oxygen-starved. This will help to keep the reactor 13 from overheating and the slightly reducing atmosphere created in the reactor tends to convert the lead salts deposited on the catalyst pellets into small lead balls that separate from the catalyst pellets and leave more active catalyst surface area. The venturi device 21 shown in FIG. 3 provides means to attain the desirable relationship between inducted secondary and exhaust gas flow just described.

The venturi device 21 includes a convergent nozzle 83 and a divergent diffuser 85 which define a throat 87 opening into the plenum chamber 89. The housing 91 includes inlet means 93 to admit air to the plenum chamber 89 and harmful back flow of exhaust may be avoided by suitable means such as locating the air inlet at the rear of the vehicle or by check valve means 94. Air in chamber 89 is drawn through the throat 87 into the exhaust gas stream at a rate which is substantially directly proportional to the rate of exhaust gas flow through the nozzle and diffuser. However, means such as a multi-stage by-pass valve 95 is preferably provided in the housing 91 upstream of the venturi throat 87 so that at increasing rates of exhaust gas flow increasing amounts of exhaust gas are by-passed into passage 97 in the housing around the venturi whereby the amount of air inducted decreases with an increasing rate of exhaust gas flow.

The by-pass valve 95 includes a stationary seat 99 formed in housing 91 for an outer, annular weight and valve element 101 which can move vertically with respect to the seat in a suitable guide 102. The outer valve 101 has a counterbore 103 formed in its top surface, the bottom of which forms a seat for an inner weight and valve element 107 which has a head 109 that is smaller in diameter than the counterbore 103 and a stem 111 that has a passage 113 opening out of the bottom of the element and out of the sides of the stem adjacent to the head 109.

The inlet and outlet ends 115 and 117 of the housing 91 are connected into the exhaust gas line 11 by suitable means (such as conventional clamps) and the unit is preferably located as far upstream as practical in any given installation. The unit is mounted so that the axis of by-pass valve 95 is vertical.

At exhaust gas flows below about 45-50 c.m.f. the by-pass valve 95 is closed and all exhaust flows through throat 87 to inspirate secondary air. As gas flows increase the pressure beneath the valve becomes great enough to lift head 109 off its seat and permit some bypassing of exhaust gas into passage 97. As pressure increases more, control passes to gas flow through the passage 113. Eventually, the gas flow may reach the point where the pressure is sufficient to lift the outer weight 101 from its seat 99 and upon sufficient movement of the weight 101 substantially all the gas will by-pass the venturi and substantially no secondary air will be inducted into the system. Proper selection of the weight and areas of the valve elements 101 and 107 and the size of passage 113 will enable the relationship between the rate of exhaust gas flow and the rate of by-passing or secondary air induction to be controlled as desired. Desirably, substantially all the secondary air is cut-off at exhaust gas flow rates above 80 c.f.m. A device to put off secondary air at high rates of flow is especially desirable when the engine 3 is over 200 cubic inch displacement.

FIG. 4 shows qualitatively the relationship between pressure on the inlet side and flow through the by-pass valve 95. From $o$ to $a$ the valve 95 is closed and all flow is through the venturi; from $a$ to $b$ the head 107 is unseated to control flow; from $b$ to $c$ the passage 113 is controlling; from $c$ to $d$ the weight 101 is unseated to control flow; and thereafter the valve is wide open. This pressure flow relationship gives a relationship between induced secondary air and exhaust gas flow that is qualitatively shown by curve 119 in FIG. 5, point $e$ preferably being at about 80 c.f.m.

If a pump is used instead of a venturi to induce secondary air, a sonic nozzle (orifice) is preferably attached in the inlet or outlet of the pump so as to provide the relationship indicated by curve 121 in FIG. 5.

CATALYTIC REACTOR

In order to fit under an automobile, the reactor 13 must be as thin and as short as possible. Nevertheless, the reactor must contain sufficient catalyst to convert emissions over an extended time period from all U.S. manufactured automobiles since the system is intended for substantially universal application to them. The catalyst bed must be thick enough to convert gases passing through it and it must warm-up fast. However, it also must have a high rate of heat rejection to help avoid over-heating, and be shaped so that the catalyst pellets do not break up or attrite because of internal forces during heating and cooling. The reactor must have an acceptably low back pressure and be constructed in such a manner that it can be manufactured by mass production techniques at a reasonable cost.

These various desirable features, and others, are achieved in a reactor design of the type shown in FIGS. 6–17. The reactor 13 includes a center tube 141 which is substantially 28 inches long and has louvers 143 along preferably 25 inches of its length. Depending upon the design of louvers used the openings in the tube 141 cover 11–25% of its area. Preferably, 20–25% of the tube area over the 25 inch length is open provided adequate column strength is maintained. The openings are preferably uniformly positioned around and along the open part of the tube. The tube is nominally 2.25 inches outer diameter with a wall thickness of .036 inch. The exhaust pipe 11 and tailpipe 15 have substantially the same internal diameters as tube 141.

The upstream end of center tube 141 is open and has a slip fit inside the bushing portion 145 of an end header 147, while the downstream end of the tube 141 is closed by a plug or partition 149 and fitted in the neck 151 of a header 153 to both of which it is welded is a gas tight joint. Since the tube 141 is anchored at only one end, it can expand and contract relative to the other parts of the reactor.

Concentric with the round center tube 141 is a round outer catalyst bed support 155 which extends the full length of the reactor, being preferably 26½ inches long and 4½ in outer diameter. Thus, the catalyst bed or chamber 157 defined between support 155 and tube 141 has a uniform thickness of about 1.089 inches (nominal thickness of 1 inch). The support 155 has louvers 158 transversely aligned with the 25 inches of louvers in tube 141, and these give the support about 12% open area. The individual louvers in both the tube and support are made as large as possible without permitting escape of catalyst pellets (not shown) from the bed 157. As seen in FIG. 10, the louvers in opposite halves of the tube and support face in opposite directions and open toward the bottom of the reactor. The top 90 to 120° of the support, along its full length, is unlouvered or closed and this sector forms a catalyst reservoir chamber 157a through which the gas does not flow in passing through the bed. The reservoir 157a provides fresh catalyst to replace that lost from the flow-through bed portion by gas flow.

The upstream end of the outer support 155 fits on and is welded to the outer flange 159 on the end header 147 while the other (downstream) end fits on and is welded to the outer flange 161 on an inner end header 153. Also welded to the upstream flange 159 is the upstream end 163 of the outer housing 165. Welded to the downstream flange 161 and the inner peripheral flange 167 of the outer end header 169 is the downstream end of support 155, the header 169 having an outer flange 171 that is welded to the downstream end 173 of the outer housing 165. It will be noted that the upstream end of the housing 165 and the major part of its length is oval in cross section, whereas commencing in a downstream portion 175 the oval section is narrowed and heightened into a circular cross section along the axial portion 177 that extends to the downstream end 173 of the housing 165. The axis of circular housing portion 177 is offset upwardly from the axis of tube 141 and support 155 so that the outer end header 169 has the arcuate shape seen in FIG. 8.

If desired, the tube 141, support 155, and housing 165 may be rolled from flat stock and their seams 179, 181, 183 are radially aligned along the minor axis of the oval housing 165. Five or six longitudinally spaced holes (not shown) are drilled through the seam 183 and the housing is heli-arc welded through them to the seam 181 of support 155. On the opposite side of the minor axis, the outer housing 165 is embossed inwardly at six points, as seen at 185, to contact the support 155. Holes are drilled in the embossments 185 and the housing is heli-arc welded to the support 155 at these points.

Stiffness against excessive transverse deflection of the bed support 155 is provided by two internal partitions 187 and 189 which have flanges 191 that are spotwelded to the support. The internal diameter of each partition is provided with a neck 193 extending downstream and opposite to the flange 191 and which are substantially larger in diameter than the tube 141 to permit free gas and catalyst flow in the bed. The walls of the partitions 187 and 189 are provided with a multiplicity of $\frac{3}{16}$ inch diameter openings 195 for the same purpose.

Five flanged flow equalizing partitions 197, 199, 201, 203 and 205 are preferably uniformly spaced along the inside of the tube 141 and spotwelded to it. These have openings 207 in the walls thereof that are respectively $1\frac{13}{16}$, $1\frac{3}{4}$, $1\frac{5}{8}$, $1\frac{9}{16}$, and $1\frac{5}{16}$ inches in diameter, decreasing in size progressively in the downstream direction to impose an increasing resistance to flow of the exhaust gas and thereby cause it to flow radially outwardly from the tube 141 through louvers 143 and into the bed 157 at a substantially uniform rate along the length of the tube 141.

Gases leaving the bed 157 through the louvers 158 of support 155 are divided into two streams and enter one or the other of the arcuate longitudinal passages 209 or 211 (FIG. 10) between the support 155 and housing 165 to flow downstream to circular housing portion 177 where they merge into the arcuate passage 213. An outlet bushing 215 is attached to the top of the housing portion 177 to extend radially of the housing and it is slotted at 217 whereby it may be contracted by a clamp 221 to tightly grip the end of tailpipe 15. Holes 219 may be formed in the bushing 215 and tailpipe to receive pins 220 in the tailpipe clamp 221, to keep the bushing and pipe from working loose since they extend in a vertical direction. It will be noted that the side outlet greatly shortens the length of the reactor 13 as compared with an axial outlet, simplifies its construction, enables it to fit in ahead of the rear axle 19, and eliminates some bends in the tailpipe since the bushing 215 already extends in the direction of the kickup 17 to get over the axle 19.

FIGS. 11 and 12 are sections showing the shape of the fine flat louvers 158 used in the outer support 155 and which may also be used in the center tube 141. In order to obtain greater open area in the wall of the center tube 141, U-shaped louvers 158a having a cross-sectional shape as shown in FIG. 13 may be used if desired. Since both sides of the louvers 158a are open they have somewhat less strength than the louvers of FIGS. 11 and 12 but the rib 158b furnishes additional stiffness to the louver construction.

The reactor 13 has an overall height of 5 inches along the minor axis of housing 165 and, as seen in FIG. 1, is well adapted to fit in a small space beneath an automobile frame 223, the side outlet 215 taking advantage of the increased vertical space available at the fender well 225. The total overall length of the reactor is about 30 inches and its maximum width is just a little over 6 inches. The catalyst bed 157 is annular and circular having a nominal thickness of 1 inch and an effective length of about 25 inches. It has a volume of about 293 cubic inches and holds 6 pounds of catalyst sold by American Cyanamide Company. In order to handle exhaust gas at an average rate of 35 c.f.m. and engines up to 425 cubic inches we prefer that the volume of the bed be in the range of 250 to 300 cubic inches and that variations in volume by achieved by change in length of the bed rather than changes in thickness or diameter. We have found that the annular bed of about 1 inch thickness and the volumes and sizes indicated is about the optimum from the standpoint of balancing the various factors of fast warm-up, good conversion, maximum heat rejection, and maximum resistance to catalyst attrition.

A modified construction for a reactor is shown in FIGS. 14–17 in which the reactor 13a has an overall height that is substantially less than the reactor 13, previously described. The construction of the reactor 13a is very similar to that of the reactor of FIGS. 6–10 and it preferably has the same specifications with respect to the diameters of the catalyst bed, the percentage of open area in the center tube and the outer bed support, the bed thickness and length, and the amount of catalyst in the bed.

The primary structural change resides in the cut-off of the top of the outer wall of the catalyst bed in the reservoir area and the offsetting of the axis of the bed upwardly toward the top of the reactor from the axis of the outer shell.

The reactor 13a has an elongated oval shaped outer shell 231 which is closed at its inlet end by a header 233 and at its downstream end by a header 235. Gas entering the reactor is received by the center tube 237. This contains a series of internal flow restrictor partitions 239 that, along with the center tube, are identical with the structure of FIGS. 6–13.

An outer catalyst bed support 241 surrounds and is concentric with the center tube 237 and forms with it a catalyst bed 243 which is preferably identical in diameter and length with the bend 157. The axis of the concentric center tube 237 and outer bed support 241 is preferably offset upwardly toward the top of the reactor 13 by a slight distance, 5/16 of an inch in the particular structure revealed in the drawing. The inside width of the shell 231 along the minor axis is 4 inches in the design of FIGS. 14 to 17 whereas in the design of FIGS. 6–10 it is 4⅝ inches. The decreased height in the structure of FIGS. 14–17 is obtained by reason of the structure shown best in FIG. 15 where it is seen that the outer bed support 241 is not perfectly round but is flattened on the top (right) side so as to fit closely to the inner wall of the outer casing 231 along the area 245. Since this is the top of the catalyst bed 243 it corresponds to the unlouvered reservoir area that is included in the angle of preferably 115° in which the outer bed has no louvers as indicated by the phantom line 247.

The inside of the outer support 241 is preferably reinforced by means of interior partitions 249 which correspond in function and structure to the internal partitions 187 and 189 of the previous design. The catalyst bed support 241 is spotwelded or otherwise suitably attached along the area 245 to the casing 231. At the opposite end of the minor axis of the reactor, the outer casing 231 is embossed upwardly, as seen at 251, and holes are drilled in these embossments so that the shell can be heli-arc welded, or otherwise suitably attached, to the bed support 241.

As in the previous design, gas enters the reactor 13a through the center tube 237, flows out of the center tube through its louvers 237a, through the catalyst bed 243, and out of the catalyst bed 241 through its louvers 241a into one or the other of the longitudinal passages 253 and 255 into which the space inside casing 231 is divided by the catalyst bed support 241. The gases in passages 253, 255 flow downstream to the end of the casing 231 which is reduced in major diameter and increased in minor diameter and its axis offset upwardly by ½ inch, as seen in FIG. 16, to form an outlet section 257 containing the outlet chamber 259. Whereas the main portion of the oval casing 231 is preferably 4 x 7¾ inch dimensions, section 257 is preferably 5 x 7¼ inch dimensions. This overall height of the reactor 13a is approximately 1 inch less than that of the reactor shown in FIGS. 6–10. Comparison of FIGS. 8 and 16 will show how the height has been reduced without sacrifice of operating performance.

Another important difference between the reactor 13a and the reactor 13 resides in the outlet structure. The section 257 of the reactor 13a has an outlet neck 261 which is formed on a spherical surface. This will therefore receive a similarly shaped spherical surface on a bushing 263 which is arranged to receive and be clamped to the tailpipe section 17. The bushing 263 can swivel on the bushing surface 261 and is held in place on it by means of an outer support 265, of spherical shape, which is bolted or otherwise suitably attached to the outside of the casing, as indicated at 267. It will be seen that the structure just described forms a ball joint outlet arrangement which permits substantial adjustments in alignment between the tailpipe and the reactor 13a and at the same time is leak-proof.

FIG. 18 shows a system in which the exhaust pipe and secondary air structures incorporate features that are somewhat different than those previously described. In this system, the reactor structure 301 may be of any suitable type, such as the reactors 13 or 13a already described, and includes a catalyst bed 303 which receives gas from the center tube 305.

The exhaust manifold 307 of the engine delivers gas to an exhaust pipe section 309 and this is connected at its downstream end to the center tube 305 of the reactor 301. The exhaust pipe 300 comprises an inner pipe 311 and an outer pipe 313. The pipes 311 and 313 are spaced so as to form a chamber 315 between the two pipes. This is sealed at the upstream end by suitable means and also at the downstream end by a suitable means, such as the plug 317. Thus, in the absence of external connections, to be described, the space 315 between the pipes 311 and 313 constitutes dead air sound and heat insulating space. This, of course, acts to preserve heat in the exhaust gases and therefore assist in the warm-up of the reactor 301.

The outer tube 313 is necked down into circumferential contact with the inner pipe 311 at longitudinally spaced points such as indicated at 319, 321 and 323. This, therefore, divides the space 315 into dead sound attenuating chambers 325, 327, and 329 through which gas does not flow. The inner tube 311 that is associated with the chamber 325 is provided with a bank of louvers 331. These are preferably located in the pipe 311 at a position corresponding to a pressure point or anti-node of a frequency which it is desired to silence. The length of the chamber 325 can be selected so that in conjunction with the bank of louvers 331, it is tuned to attenuate the desired frequency. It can act as a quincke or quarter wave length tuning chamber.

If desired as a variation on the structure described, a conduit 333 may be connected between space 325 and the intake manifold. This will provide some additional insulating effect and will permit recirculation through the engine of some of the exhaust gases to help reduce smog forming constituents including the nitrogen oxides. If desired, of course, the louvers 331 can be omitted and space 325 used simply as a vacuum inslated chamber around pipe 311.

The pipe 311 at those sections that are aligned with the chambers 327 and 329 are provided with banks of louvers 335, 337. Since the chambers 327 and 329 are relatively small in volume, it will be seen that they can act to attenuate the high frequency and roughness sound associated with the exhaust gases.

It has been found that the space 315 between the inner and outer layers of pipe may be used for sound attenuation in the manner illustrated without a serious adverse effect upon the heat insulating properties of the double layer construction. The pipe insulation should be sufficient to maintain a gas temperature of 600–700° F. at the inlet end of the reactor 301 during the desired times. This can be obtained and, in addition, silencing can be achieved by means of the structure illustrated. The pinch downs 319, 321, and 323 can be located as desired to obtain the desired volumes and the banks of louvers can be located at the proper longitudinal position (adjacent anti-nodes of frequencies to be attenuated) to take out the frequencies and sound that may be troublesome in spite of the presence of the reactor 301 in the system.

Adjacent the inlet to the reactor 301 is a venturi device 335 for inducing a secondary air flow into the exhaust gases flowing through the pipe 311. As illustrated, the venturi device comprises a longitudinally extending partition 337 which divides the flow passage between the pipe 311 and the center tube 305 into two sections 339 and 341. In the section 339 is located a venturi nozzle 343 and diffuser 345 which will create a low pressure area at the venturi neck or throat 347. This low pressure is used to induct fresh air for mixing with the exhaust gases in the system. Preferably, this comes from a conduit 349 which has its inlet end opening into the space between the inner pipe and the outer pipe 313. At an upstream point, the outer pipe 313 is provided with a temperature responsive inlet valve 351, such as one containing a bimetal actuated valve element. This valve is arranged so as to open either gradually or completely at about 600° F., that is, when the gases in the pipe 311 are at about that temperature, which temperature will be transmitted to the valve 351 because of the conduction of heat through the metal. At temperatures of about 600° F., fresh air will be admitted to the space 353 between the outer pipe 313 and the inner pipe 311 and it will flow downstream to the conduit 349 where it can flow into the venturi throat 347 and thus into the reactor 301. Such air will be preheated due to the fact that it flows for a substantial length in contact with the pipe 311. When that temperature is below about 600° F., the valve 351 will be closed to obtain maximum heat insulation since the chamber 353 then acts as a vacuum insulation chamber because it is connected to the venturi.

The venturi device 335 includes a pivoted and weighted valve member 355 which at flow below about 45 c.f.m. will close the passage 341 and force all the gas to flow through the passage 339 whereby air is inducted into the system as soon as the engine gases reach a temperature to open valve 351. As the flows increase above 45 c.f.m., the valve 355 will gradually open and at flows in the neighborhood of about 80 c.f.m. it will be pivoted upwardly far enough to close off the passage 339 so that no secondary air is inducted into the system. Thus, the venturi device 335 will function in the manner similar to the device 21 that has been previously described.

The partial system shown in FIG. 18 is intended to show modified or additional features that may be incorporated in the system of FIG. 1 and, it is, of course, apparent that the silencing features, the vacuum insulation feature, or the preheated secondary air feature can be individually omitted or changed in location as is desired.

Modifications may be made in the structure and method illustrated and described without departing from the spirit and scope of the invention.

We claim:

1. In an automobile having a rear axle and an internal combustion engine with an exhaust manifold, means for controlling the exhaust emissions of the engine so that on idle the unburned hydrocarbons are not substantially higher than 1500 p.p.m. and the CO is substantially in the range of 1½ to 3½% and during normal driving the unburned hydrocarbons are not substantially higher than 700 p.p.m. and the CO is substantially in the range of 1½ to 3½% and during deceleration the unburned hydrocarbons are not substantially higher than 3000 p.p.m. and the CO is substantially in the range of 1½ to 3½%, a catalytic reactor having a catalyst bed of annular form containing substantially 250–300 cubic inches of catalyst pellets, said reactor having a capacity to handle an average of 35 c.f.m. of exhaust gas and engines of up to about 425 cubic inches displacement, said bed having an effective length of substantially 25 inches and a uniform thickness of substantially 1 inch, a circular center tube defining the inner surface of said catalyst bed and the inlet passage for the flow of exhaust gas to said bed, said center tube having a louvered wall that is substantially 10–25% open area formed by louvers spaced uniformly along and around substantially 25 inches of the length of said tube, means in said center tube providing for substantially uniform radial outward flow of exhaust gas along the length thereof, a tubular shell defining the outer and outlet surface of said catalyst bed, said shell having a louvered wall that is substantially 12% open area spread uniformly along substantially 25 inches of the length thereof and in transverse alignment with the open area of said center tube, the louvers on opposite halves of said tube and shell facing in opposite directions and opening toward the bottom of said reactor, said reactor having an elongated oval outer housing disposed so that its minor axis is substantially vertical and so that along the opposite ends of the minor axis thereof it is in contact with and secured to said tubular shell and defines therewith arcuate longitudinal outlet gas flow passages for gas leaving said catalyst bed, the downstream end of said outer housing being decreased in major width and increased in minor width and the bottom side thereof substantially and the top side spaced above said tubular shell to define an outlet chamber on the top of said reactor into which said gas flows from said outlet passages, the downstream end of said reactor being located adjacent said rear axle, said reactor having an outlet bushing projecting radially of the axis of said center tube and upwardly and adapted to project upwardly into the space under said automobile adjacent said rear axle, a tailpipe connected to said outlet bushing and curved to extend over said rear axle, an insulated exhaust gas pipe connecting said exhaust manifold to said center tube and acting to preserve sensible heat in the exhaust gas flowing to said reactor, and means for supplying secondary air to said exhaust gases.

2. In an automobile having a rear axle and an internal combustion engine with an exhaust manifold, means for controlling the exhaust emissions of the engine so that on idle the unburned hydrocarbons are not substantially higher than 1500 p.p.m. and the CO is substantially in the range of 1½ to 3½% and during normal driving the unburned hydrocarbons are not substantially higher than 700 p.p.m. and the CO is substantially in the range of 1½ to 3½% and during deceleration the unburned hydrocarbons are not substantially higher than 3000 p.p.m.

and the CO is substantially in the range of 1½ to 3½%, a catalytic reactor having an annular catalyst bed containing substantially 250–300 cubic inches of catalyst pellets, said reactor having a capacity to handle an average of 35 c.f.m. of exhaust gas and engines of up to about 425 cubic inches displacement, said bed having an effective length of substantially 25 inches and a uniform thickness of substantially 1 inch, a circular center tube defining the inner surface of said catalyst bed and the inlet passage for the flow of exhaust gas to said bed, said center tube having a louvered wall that is substantially 10–25% open area spaced uniformly along and around substantially 25 inches of the length of said tube, means in said center tube providing for substantially uniform radial outward flow of exhaust gas along the length thereof, a tubular shell defining the outer and outlet surface of said catalyst bed, said shell having a louvered wall that is substantially 12% open area spread uniformly along substantially 25 inches of the length thereof and in transverse alignment with the open area of said center tube, said reactor having an elongated over outer housing disposed so that its minor axis substantially vertical and its longitudinal axis is horizontal, the downstream end of said outer housing being located adjacent said rear axle and having an outlet bushing projecting radially of the axis of said center tube and upwardly and adapted to project upwardly into the space under said automobile adjacent said rear axle, a tailpipe secured to said outlet bushing and curved to extend over the rear axle, an insulated exhaust gas pipe connecting said exhaust manifold to said center tube and acting to preserve sensible heat in the exhaust gas flowing to said reactor, means for supplying secondary air to said exhaust gases in amounts of about 2 to 2½ c.f.m. at idle and 4 to 5 c.f.m. at exhaust gas flows of up to about 30 to 35 c.f.m.

3. The invention set forth in claim 2 including means for decreasing the supply of secondary air above exhaust gas flows of about 45 to 50 c.f.m. to substantially no secondary air at exhaust gas flows of about 80 c.f.m.

4. In an automobile having a rear axle and an internal combustion engine with an exhaust manifold, means for controlling the exhaust emissions of the engine so that on idle the unburned hydrocarbons are not substantially higher than 1500 p.p.m. and the CO is substantially in the range of 1½ to 3½% and during normal driving the unburned hydrocarbons are not substantially higher than 700 p.p.m. and the CO is substantially in the range of 1½ to 3½% and during deceleration the unburned hydrocarbons are not substantially higher than 3000 p.p.m. and the CO is substantially in the range of 1½ to 3½, a catalytic reactor having an annular catalyst bed containing substantially 250–300 cubic inches of catalyst pellets and including a reservoir section located on the top of the reactor, said reactor having a capacity to handle an average of 35 c.f.m. of exhaust gas and engines of up to about 425 cubic inches displacement, said bed having an effective length of substantially 25 inches and a uniform thickness of substantially 1 inch, a circular center tube defining the inner surface of said catalyst bed and the inlet passage for the flow of exhaust gas to said bed, said center tube having a louvered wall that is substantially 10–25% open area spaced uniformly along substantially 25 inches of the length of said tube, means in said center tube providing for substantially uniform radial outward flow of exhaust gas along the length thereof, a tubular shell defining the outer and outlet surface of said catalyst bed, said shell having a louvered wall that is substantially 12% open area spread uniformly along substantially 25 inches of the length thereof and in transverse alignment with the open area of said center tube, said center tube and shell being concentric, the louvers on opposite halves of said tube and shell facing in opposite directions and opening toward the bottom of said reactor, said reactor having an elongated oval outer housing disposed so that along the opposite ends of the minor axis thereof it is in contact with and secured to said shell and defines therewith arcuate longitudinal outlet gas flow passages for gas leaving said catalyst bed, the downstream end of said outer housing being enlarged in height and decreased in width and the bottom side thereof substantially tangent to said circular shell and the top side spaced above said shell to define an outlet chamber on the top of said reactor into which said gas flows from said outlet passages, said reactor having a swivelly mounted outlet bushing projecting radially of the axis of said center tube and upwardly and adapted to project upwardly into the space under said automobile adjacent said rear axle, a tailpipe connected to said outlet bushing and curved to extend over said rear axle, an insulated exhaust gas pipe connecting said exhaust manifold to the center tube of said reactor and acting to preserve sensible heat in the exhaust gas flowing to said reactor, and secondary air induction means for inducting secondary air into said exhaust gases, said secondary air means comprising a venturi in said exhaust gas pipe having an air inlet and a throat located to inspirate air through said inlet as exhaust gas passes through said venturi, a by-pass passage for exhaust gas flow around said venturi, valve means responsive to the rate of flow of exhaust gas in said exhaust gas pipe for controlling flow through said by-pass passage, said valve means being arranged to open at exhaust gas flows of about 45 c.f.m. and to open further at higher flows substantially in proportion to the rate of flow so that progressively less secondary air is inducted at flows above about 45 c.f.m. and at about 80 c.f.m. the by-pass is wide open so that there is substantially no secondary air inducted by said venturi.

5. In an internal combustion engine having means to control exhaust gas emissions so that during normal driving they are not substantially higher than about 700 p.p.m. hydrocarbons and about 3% CO, a catalytic reactor for burning said emissions and heat insulating conduit means for connecting the reactor to the engine to receive all exhaust gases from the engine, said reactor or including a catalyst bed through which all the exhaust gas flow at all times, means for controlling the emissions so that on deceleration of the engine they are not substantially higher than about 3000 p.p.m. hydrocarbons and about 3½% CO, means for adding secondary air to the exhaust gases ahead of the reactor and including means for limiting the secondary air to a predetermined maximum occurring at an intermediate rate of exhaust gas flow, said conduit means including spaced inner and outer walls defining a dead air chamber, and means for connecting said chamber to the intake manifold of the engine.

References Cited

UNITED STATES PATENTS

| | | | |
|---|---|---|---|
| 3,197,287 | 7/1965 | Innes et al. | 23—288 |
| 3,086,353 | 4/1963 | Ridgway | 60—30 |
| 2,747,976 | 5/1956 | Houdry | 60—30 |
| 2,988,074 | 6/1961 | Lobdell et al. | 123—117X |
| 3,027,884 | 4/1962 | Bale Jr. et al. | 123—117X |
| 3,045,422 | 7/1962 | Houdry | 60—30 |
| 3,166,895 | 1/1965 | Slayter et al. | 60—29 |

WENDELL E. BURNS, Primary Examiner

U.S. Cl. X.R.

60—29